(12) United States Patent
Shah et al.

(10) Patent No.: US 8,939,037 B2
(45) Date of Patent: Jan. 27, 2015

(54) EMBEDDED DATA ACQUISITION

(75) Inventors: Dhaval Shah, Fremont, CA (US);
Stephen B. Lynch, Portola Valley, CA (US); Andrzej Baranski, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 13/523,872

(22) Filed: Jun. 14, 2012

(65) Prior Publication Data

US 2013/0333485 A1 Dec. 19, 2013

(51) Int. Cl.
*G01L 1/22* (2006.01)
(52) U.S. Cl.
USPC ........................................ 73/862.045; 73/768
(58) Field of Classification Search
CPC .............. G01L 1/22; G01L 1/18; G01L 1/20; G01L 1/205; G01L 5/16; G01L 5/161; G01L 5/162
USPC .................................................... 73/862.045
See application file for complete search history.

(56) References Cited

U.S. PATENT DOCUMENTS

| | | | |
|---|---|---|---|
| 5,479,827 A * | 1/1996 | Kimura et al. | 73/718 |
| 6,191,593 B1 | 2/2001 | Tartagni et al. | |
| 6,884,641 B2 | 4/2005 | Bruley et al. | |
| 7,521,915 B2 | 4/2009 | Herchen | |
| 7,830,267 B2 * | 11/2010 | Veerasamy | 340/602 |
| 7,968,878 B2 | 6/2011 | Aggarwal et al. | |
| 8,091,437 B2 * | 1/2012 | Stumpf | 73/862.041 |
| 8,253,425 B2 | 8/2012 | Reynolds et al. | |

OTHER PUBLICATIONS

Authors: Andrew Mason, Navid Yazdi, Abhijeet V. Chavan, Khalil Najafi, and Kensall D. Wise, Title: A Generic Multielement Microsystem for Portable Wireless Applications, Date: Aug. 1998, Publication: Proceedings of the IEEE, vol. 86, No. 8, pp. 1733-1746.*

Authors: H. F. schlaak, F. Arndt, A. Steckenborn, H. J. Gevatter, L. Kiesewetter, and H. Grethen, Title: Micromechanical Capacitive Acceleration Sensor with Force Compensation, Date: 1990, Publication: Micro System Technologies 90 © Springer-Verlag Berlin Heidelberg, pp. 617-622.*

* cited by examiner

*Primary Examiner* — Lisa Caputo
*Assistant Examiner* — Roger Hernandez-Prewit
(74) *Attorney, Agent, or Firm* — Brownstein Hyatt Farber Schreck, LLP (57) ABSTRACT

Embodiments are generally directed to methods and apparatuses having electronic device cover glass that includes embedded sensors. In particular, one embodiment may take the form of a device having a device housing and a cover glass coupled to the device housing. The device includes a plurality of sensors coupled to the cover glass and configured to acquire data related to stress and strain experienced by the cover glass. The plurality of sensors is embedded within the cover glass.

12 Claims, 8 Drawing Sheets

EMBEDDED DATA ACQUISITION

TECHNICAL FIELD

The present application is generally related to obtaining data from devices and more particularly to embedding sensors in devices in a manner that they may obtain data related to stresses on a display cover glass.

BACKGROUND

Portable electronic devices have become ubiquitous in today's society. Cellular phone, smart phones, tablet computers, and notebook computers, to name a few common portable electronic devices, are commonly used in businesses, education, and society at large. Almost without exception, portable electronic devices have one or more user interfaces including inputs such as buttons, switches, and/or touch sensitive input devices, and output device such as displays, speakers and haptics. Among all of the various user interfaces, the display may be the most susceptible to damage. Specifically, a cover glass of the display often cracks under stresses incurred by a drop, for example. Additionally, in smart phones and tablet devices, the display cover glass typically covers an entire side of the device. As such, it is a large, exposed area that may make contact at impact and, hence, absorb the force of the impact.

Strain in cover glass is one of several measurements that may be evaluated through drop test experiments. The data from the experiments is often used to validate finite-element analysis (FEA) results or compare performance of different designs. Currently, sensors are attached to the cover glass for the experiments. However, the sensors can partially or entirely detach from the cover glass during the experiments, resulting in poor or insufficient data. The sensors may be especially susceptible to detaching if a product is dropped on the side with attached sensors.

SUMMARY

Embodiments generally may include device cover glass that has integrated sensors. In particular, one embodiment may take the form of a device having a device housing and a cover glass coupled to the device housing. The device includes a plurality of sensors coupled to the cover glass and configured to acquire data related to stress and strain experienced by the cover glass. The plurality of sensors is embedded within the cover glass.

Another embodiment may take the form of an instrumented cover glass for an electronic device having a cover glass layer and a plurality of sensors distributed on the cover glass layer. Additionally, the instrumented cover glass includes a backing layer. The backing layer sandwiches the sensors with the cover glass, and the cover glass and the backing layer forming a unitary structure.

Yet another embodiment may take the form of a method of using an instrumented cover glass. The method includes operating a plurality of sensors embedded in the instrumented cover glass and sensing an impulse event with the embedded sensors. Additionally, the method includes logging sensor data into a memory and extracting the data from the memory. Further, the method includes processing the data to determine areas of stress on the cover glass.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments may take the form of a specialized cover glass having built-in sensors. In some embodiments, the sensors may take the form of a piezoelectric sensor, such as piezoelectric or piezo-resistive sensors for strain gages. The cover glass with integrated instrumentation is ready to use out of the box for drop test experiments. There is no delay in adhering the sensors to the cover glass. Moreover, the sensors are integrated into the cover glass so there is no risk of them detaching from the cover glass. In some embodiments, the sensors may be positioned between two different layers of the cover glass. In other embodiments, the sensors may be positioned within an aperture of the cover glass and then sealed within the aperture with a material having the same or similar index of refraction and/or color as the cover glass, so that the location of the sensor cannot be easily discerned.

In some embodiments, an instrumented cover glass is provided that may be implemented in consumer products. That is, the cover glass for a smart phone or tablet computer may include sensors. The instrumented cover glass may provide data to a dedicated memory location that may act as a "black box" for the device. The information collected by the sensors may then be evaluated if/when the device is brought in for service. In some cases, the information may be added to information gathered through lab tests and the damage to the device may be documented for evaluation. Additionally, the data may be evaluated for decisions as to whether a particular repair should be covered under warranty.

Figure 1:
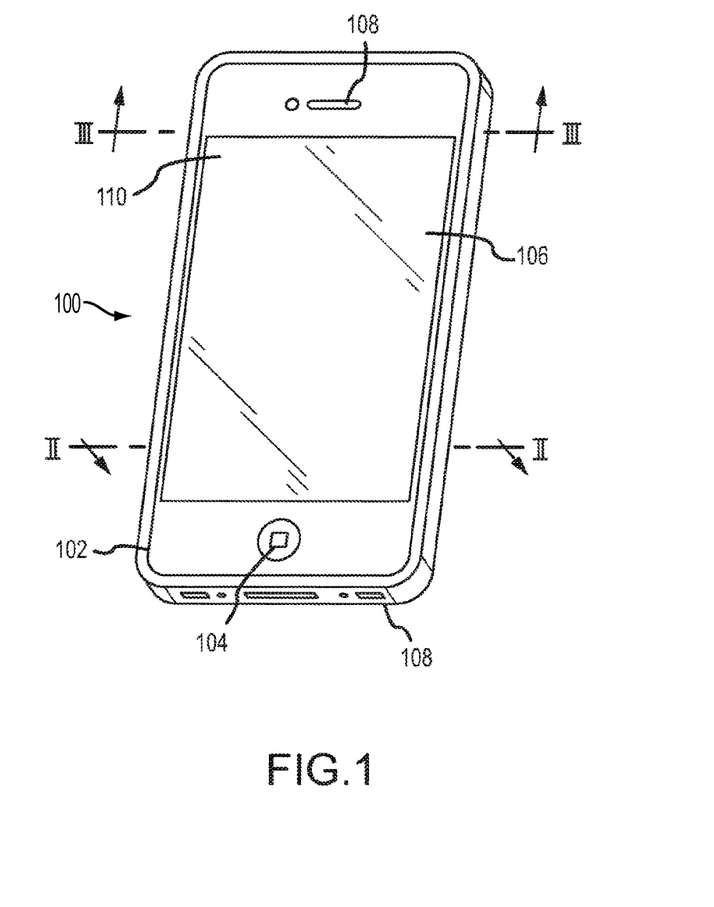
FIG. 1 illustrates an example electronic device with having a cover glass that may include integrated sensors.

Turning to FIG. 1 an electronic device 100 is illustrated. The electronic device 100 may take any suitable form such as a smart phone, a tablet computer, a notebook computer, a cell phone and so forth. In the present example, the electronic device 100 is a smart phone, such as the iPhone® made by Apple, Inc. The electronic device 100 includes a housing 102 that generally provides structure to the device and covers and provides protection to the internal electronics of the device. Several electronic features, however, are externally accessible, such as the button 104 and other switches. Additionally, output device such as the display 106 and speakers 108, for example, are configured to interact with a user. In some embodiments, the display 106 may be a touch screen display which allows a user to provide input to the device by touching the display's screen 110.

In many modern devices, the display screen 110 may constitute a significant portion of the external housing 102. In particular, in the illustrated example, the display screen 110 makes up an entire side of the device's external structure. The display screen 110 may be made of any suitable material through which light may traverse such as plastics, glasses, ceramics, and so forth. Commonly, these materials are susceptible to damage such as cracking when an impulse or impact event occurs. This is especially true when the cover glass is the part of the device that is making initial contact.

In order to understand the stresses on the display's screen that may lead to damage, sensors are integrated into the cover glass. As used herein, the term "screen" is interchangeable with the term "cover glass" as it refers to the material of the display which is externally exposed and with which a user may interact in the case of a touch screen. As such, reference to the cover glass, refers to the screen 110. The sensors collect data related to the stresses and strains that the cover glass experiences. Subsequently, the cover glass and/or support structures for the cover glass may be designed to help prevent the cover glass from experiencing damage.

Figure 2:
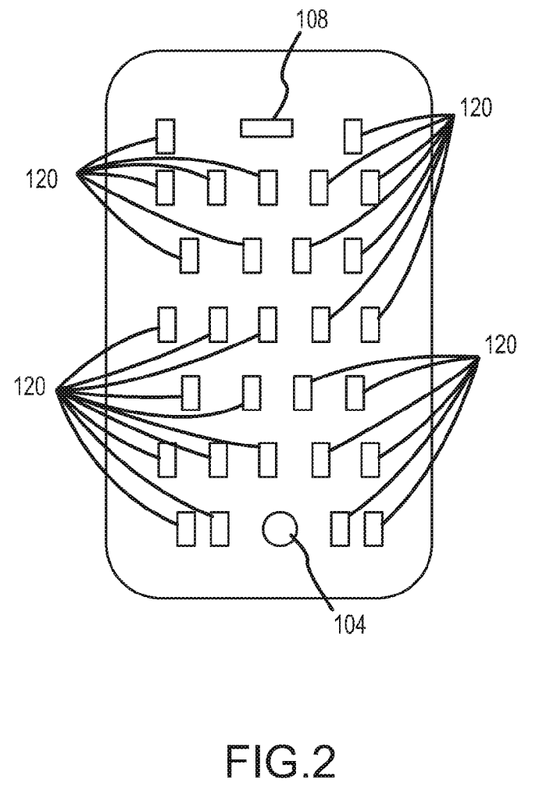
FIG. 2 is a cross-sectional view of the cover glass of the electronic device of FIG. 1 taken along line II-II to show a plurality of sensors embedded in the cover glass.

FIG. 2 is a cross sectional view of the display's screen 110 taken along line II-II. FIG. 2 illustrates a number of sensors 120 distributed within screen 110. The sensors 120 may take various forms. In some embodiments, the sensors may include strain gages, accelerometers, piezoelectric sensors, piezo-resistive sensors, and so forth. The sensors 120 are configured to sense stresses and strains on the screen 110. In an actual implementation, there may be more or fewer sensors 120. Further, the sensors 120 may be positioned or aggregated in a specific location of the screen 110 rather than distributed throughout the screen.

Generally, there may be at least two classes of cover glasses that may be implemented. Specifically, for example, a first class may take the form of a cover glass intended solely for laboratory testing. A second class may include a cover glass that is intended to be utilized in a device sold to an end user. With regard to the first class, the appearance of the cover glass may or may not be a concern. As such, the sensors may be visible through the cover glass. In contrast, with regard to the second class, visual appeal may be a concern and, as such, the sensors may be hidden so that they are not visible through the cover glass. For example, one or more sensors may be located under an ink mask so that they are not visible to a user.

Figure 3A:
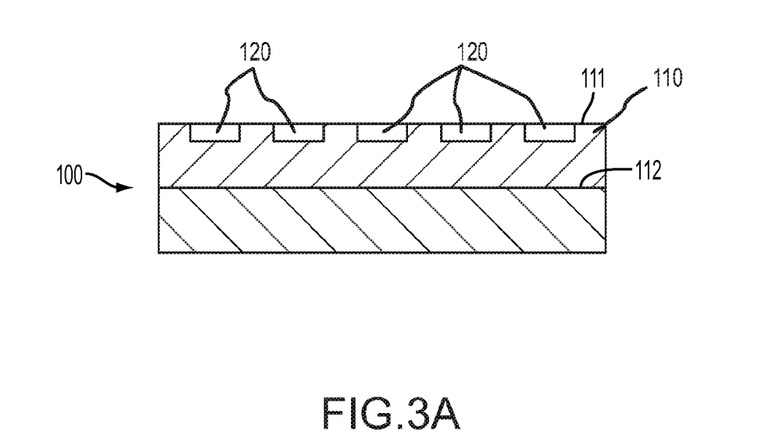
FIG. 3A is a cross-sectional view of the cover glass of the electronic device of FIG. 1 taken along line III-III showing the location of the sensors within the cover glass in accordance with an example embodiment.

FIG. 3A is a cross-sectional view of the cover glass 110 taken along line III-III in FIG. 1. As shown, each of the sensors 120 is generally coplanar within the screen 110. That is, the sensors 120 may generally have a surface that is coplanar with a surface 111 of the cover glass 110. It should be appreciated that although the sensors are shown as being integrated into the cover glass' external surface 111 (e.g., the surface facing away from the device 100), they may alternatively be integrated into the internal surface 112 (e.g., the surface facing the device), or some may be integrated into the external surface 111 and others into the internal surface 112.

Figure 3B:
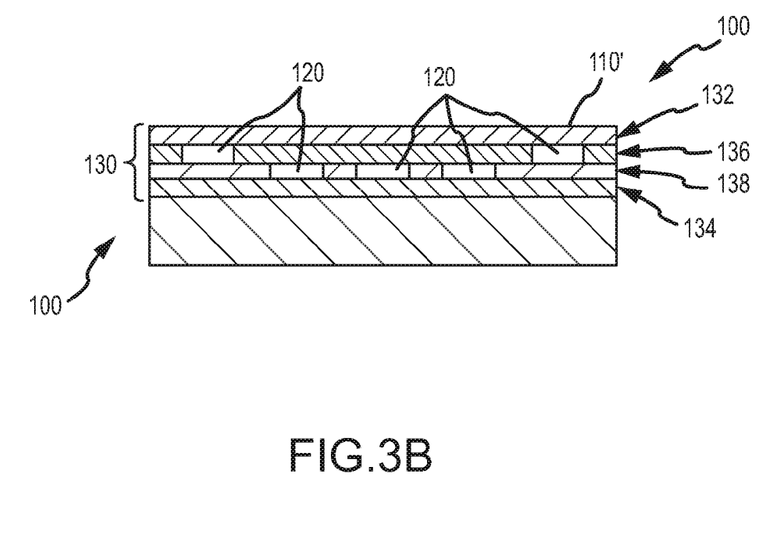
FIG. 3B is a cross-sectional view of the cover glass of the electronic device of FIG. 1 taken along line III-III showing the location of the sensors within the cover glass in accordance with an alternative example embodiment.

Additionally, the sensors 120 may be integrated into other layers of the cover glass 110'. In particular, as shown in FIG. 3B, the cover glass 110' may include multiple layers 130. For example, the cover glass 110' may include at least a top layer 132 and a bottom layer 134. The sensors 120 may be located in between the top and bottom layers 132, 134. In the illustrated example, two middle layers 136, 138 are shown and the sensors 120 are positioned within the middle layers. One or more of the multiple layers 130 may take the form of composite layers with gages embedded in the layers. Specifically, at least one of layers 136, 138 may take the form of a composite layer.

Figure 3C:
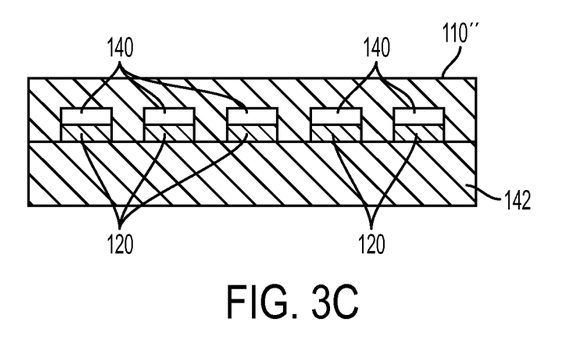
FIG. 3C is a cross-sectional view of the cover glass of the electronic device of FIG. 1 taken along line III-III showing the location of the sensors within the cover glass in accordance with an alternative example embodiment.

In still further embodiments, the sensors 120 may be located within apertures of the cover glass 110". FIG. 3C illustrates such an embodiment. Specifically, the cover glass 110" includes apertures 140 into which the sensors 120 are positioned. An adhesive may be used to secure the sensors 120 within the aperture 140. Further, a secondary material may be used to fill the aperture and further secure the sensors 120 within the apertures 140. The secondary material may take any suitable form, such as an epoxy or other material that conforms to a shape and/or hardens. One example of a secondary material is a backing layer 142 which sandwiches the sensors 120 with the cover glass 110", the cover glass 110" and the backing layer 142 forming a unitary structure.

Figure 4:
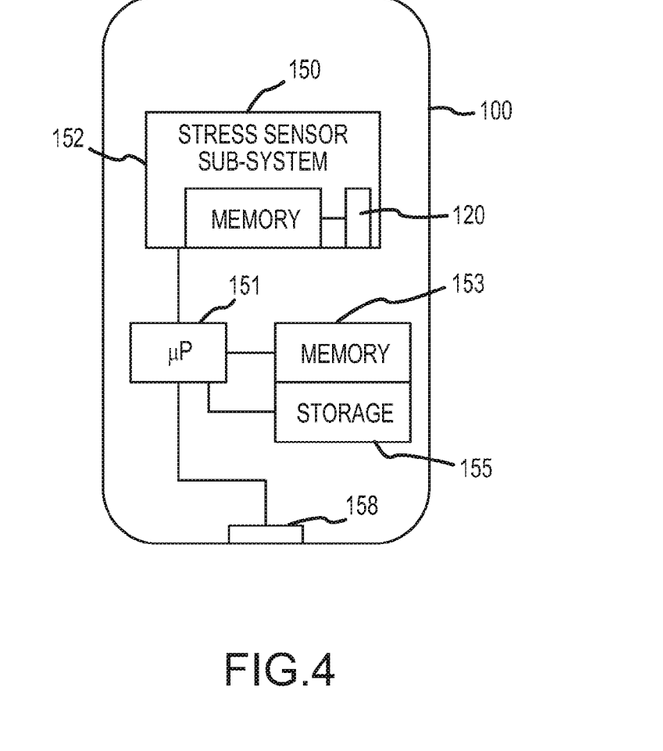
FIG. 4 is an example block diagram of the electronic device of FIG. 1 showing a stress sensor sub-system.

Having sensors integrated into the cover glass 110 may provide better data relative to sensors that are merely adhered to a surface of the cover glass 110 and risk falling off the cover glass or otherwise being fully or partially displaced on the surface of the cover glass 110. The sensors 120 may be configured to provide the collected data to a memory location that may subsequently be accessed. In FIG. 4, the device 100 is shown as including a stress sensor sub-system 150, a micro processor 151, a memory 153, and a digital storage medium 155. Generally, the memory 153 and the digital storage medium may take any suitable form known and common in the art. In particular, at least one of the memory 153 and/or the storage medium 155 may take the form of a solid state device that may with stand an impulse event.

Generally, the stress sensor sub-system 150 may include the sensors 120 and further may include a dedicated memory 152, in some embodiments. The sensors 120 may be in communication with the storage memory 152 which stores the data from the sensors. The storage memory 152 may take the form of a solid state memory device that may withstand an impulse event. The stress sensor sub-system 150 may be communicatively coupled to the micro processor 151. The micro processor 151 may direct the data from the sensors 120 to one of the memory 153 and/or the storage 155. Further, the micro processor 151 may direct the data to a connection port 158 to communicate the data to a location external from the device 100.

It should be appreciated that the example embodiment shown in FIG. 4 is merely exemplary. In other embodiments, the stress sensor sub-system 150 may include a dedicated processor and memory. As such the stress sensor sub-assembly 150 may take the form of an application specific integrated circuit (ASIC), a system-on-chip (SOC) or other such system. Further, the stress sensor sub-assembly 150 may include dedicate I/O such that the sensor sub-assembly 150 may be directly connected with external electronic devices. In some embodiments, the sub-assembly may include or be in communication with a wireless communication module that allows sensor data to be wireless transmitted to an external device for further evaluation of the data. It should further be appreciated that one or more of the foregoing examples may be better suited to a testing environment rather than for a consumer device that is to be sold to and used by an end user.

Figure 5:
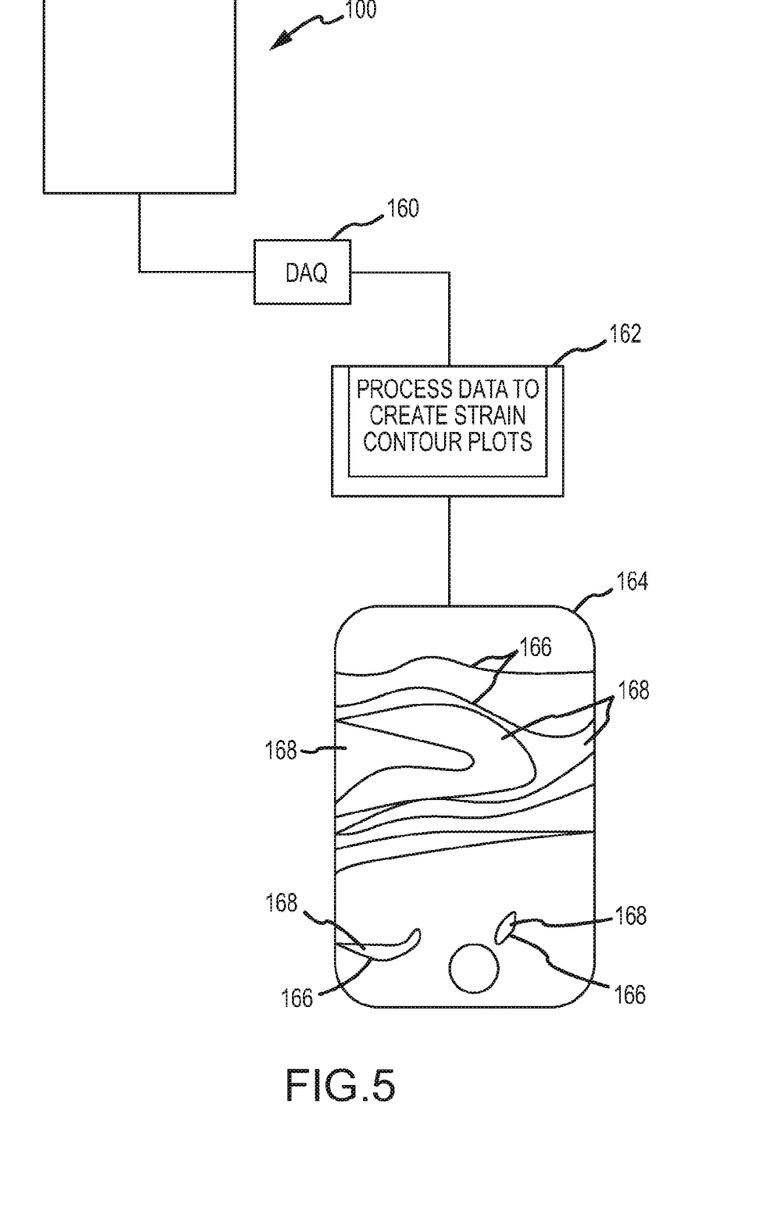
FIG. 5 illustrates an example data flow diagram for the sensor data obtained from the embedded sensors of the cover glass.

FIG. 5 illustrates a flow diagram for the sensor data external to the device 100. In particular, the data is provided from the device 100 to a data acquisition module (DAQ) 160. The DAQ 160 may take any suitable form and in some embodiments the DAQ 160 may be configured to modify the data into a useable form. For example, in some embodiments, the DAQ 160 may convert the data from analog to digital form. In some embodiments, the DAQ 160 may form part of the sensor sub-system 150 internal to the device 160 or a subsequent processing system, such as processing system 162. Generally, the processing system 162 receives the data in a digital form and processes. In some embodiments, the processing system 162 may create strain contour plots and provide a graphical representation 164 of the strain experienced by the cover glass 110. The graphical representation 164 may generally show the cover glass 110 with plot lines 166 defining regions 168 that experienced strain. Further, the regions 168 may be coded based upon the degree of strain experienced. For example, the regions 168 may be color coded based upon the amount of strain experienced. The region experiencing the most strain may be colored red and the region with the least amount of strain may be green, for example. As such, the coding may be based upon a relative amount of strain experienced by the regions 168. In other embodiments, the coding may be based upon the strain exceeding one or more threshold levels of strain, with the highest strain category being colored red and the lowest category being green, for example.

Thus, the regions that experienced the most strain for a particular impulse event may be readily discerned. In some embodiments, data from an accelerometer may be utilized to indicate an orientation of the device upon impact. Further, the processing device 162 may orient the graphical representation to reflect the orientation of the device upon impact.

Figure 6:
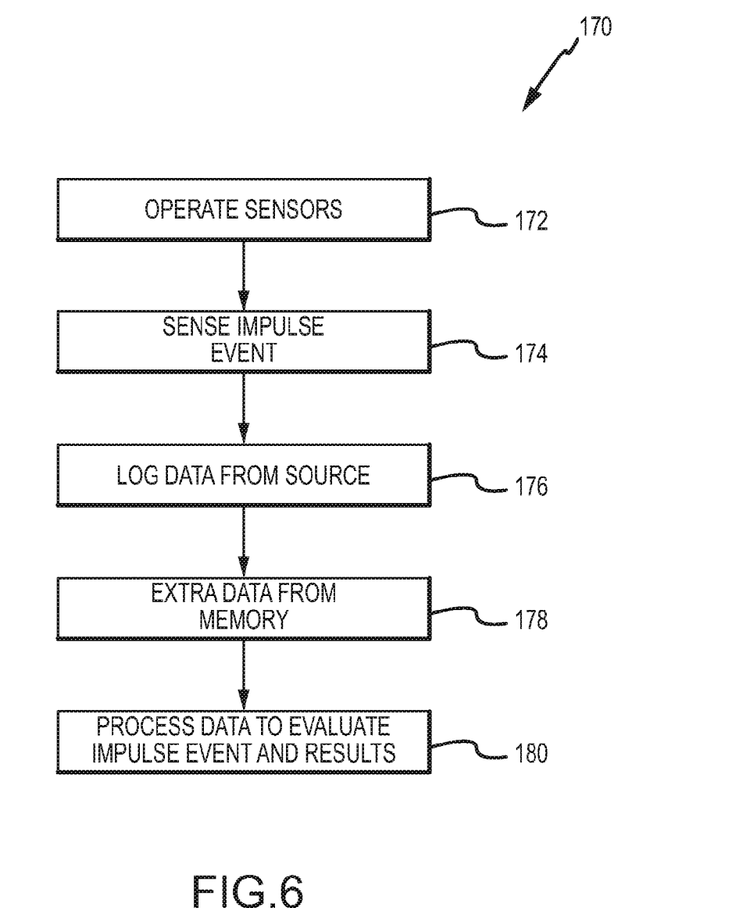
FIG. 6 is a flowchart illustrating a method of operation for the system having an electronic device with sensors embedded within the cover glass of the device.

FIG. 6 illustrates a method 170 of operation for the system that includes a device equipped with sensors embedded into the cover glass 110. The method 170 may include operating the plurality of sensors (Block 172). An impulse event is sensed by the embedded sensors (Block 174) and the sensor data is logged into memory (Block 176). The sensor data is extracted from memory and provided to a processing system (Block 178). The data is processed to determine areas of stress on the cover glass 110.

In some embodiments, the processed data is utilized to generate the strain contour plots discussed above. Additionally, in some embodiments, the sensor sub-system 150 and the sensors 120 may operate in a reduced power mode until an impulse event is anticipated. In particular, the sensors 120 and the sensor sub-system 150 may be in a sleep state until an accelerometer (in the sensor sub-system or in the device 100) may sense when a drop event occurs, at which point the sensors and sensor sub-system awake and begin to operate. In some cases, this operation may take the form of data not being stored until a drop event is sensed.

The data collected by the sensors may be used in confirming FEA analysis and/or may help to better design the cover glass and device housing to achieve more robust devices that are resilient to impulse events. Further, in some embodiments, the data may be used to evaluate a user's treatment of the device. In particular, if a damaged device is brought in for service, the data from the sensor may be read and evaluated to see what caused the damage. Furthermore, the data may indicate a history (or no history) of rough treatment of the device. The data may thus be used to make a decision as to whether a particular device repair is or should be covered under warranty. Moreover, the data retrieved from the damaged device may be added to the database of test results and, thus, may help in designing more robust devices.

The foregoing describes some example embodiments for creating and utilizing device cover glass with embedded sensors. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

The invention claimed is:

1. A portable electronic device comprising:
a portable electronic device housing;
a cover glass coupled to the portable electronic device housing; and
a plurality of sensors coupled to the cover glass and configured to acquire data related to stress and strain experienced by the cover glass, wherein the plurality of sensors are embedded within the cover glass and coplanar with an external surface of the cover glass.

2. The portable electronic device of claim 1, wherein the plurality of sensors comprises at least one force sensing strain gage.

3. The portable electronic device of claim 1, wherein the plurality of sensors comprises at least one piezoelectric sensor.

4. The portable electronic device of claim 3, wherein the at least one piezoelectric sensor comprises a piezo-resistive sensor.

5. The portable electronic device of claim 1, wherein the plurality of sensors comprises at least one accelerometer.

6. An instrumented cover glass for a portable electronic device comprising:
a cover glass layer;
a plurality of sensors embedded in an internal surface of the cover glass and coplanar with said surface; and
a backing layer in contact with said internal surface, wherein the backing layer sandwiches the sensors with the cover glass, the cover glass and the backing layer forming a unitary structure.

7. The instrumented cover glass of claim 6, wherein the backing layer comprise one of a plastic, composite, ceramic or glass material.

8. The instrumented cover glass of claim 6, wherein the backing layer and the cover glass have approximately the same stiffness.

9. The instrumented cover glass of claim 6, wherein at least one of the plurality of sensors is communicatively coupled to a memory system, and wherein the instrumented cover glass is configured to log sensor data upon sensing an impulse moment.

10. A method of operating an instrumented cover glass in a portable electronic device comprising:
operating a plurality of sensors embedded in, and coplanar with, a surface of the instrumented cover glass;
sensing an impulse event with the embedded sensors;
logging the sensor data into a memory;
extracting the sensor data from the memory; and
processing the sensor data to determine areas of stress on the cover glass.

11. The method of claim 10, wherein the processing the sensor data comprises generating a strain contour plot.

12. The method of claim 10, wherein the embedded sensors operate in a reduced power state until the impulse event.

* * * * *